United States Patent [19]

Cliffton

[11] Patent Number: 4,840,458
[45] Date of Patent: Jun. 20, 1989

[54] FIXED SHUTTER CONSTRUCTION FOR A SPLIT-SPHERE OBSERVATORY DOME

[76] Inventor: Ethan W. Cliffton, 3435 Army St., Suite 332, San Francisco, Calif. 94110

[21] Appl. No.: 130,125

[22] Filed: Dec. 8, 1987

[51] Int. Cl.⁴ ............................................. G02B 27/00
[52] U.S. Cl. .................................... 350/319; 350/321; 350/239; 114/66
[58] Field of Search ........ 350/319, 321, 239, 587–589; 114/66; 248/345; 220/255, 361; 52/308, 382, 440, 457, 458

[56] References Cited

U.S. PATENT DOCUMENTS 4,186,532  2/1980  Kahn ..................................... 114/66

FOREIGN PATENT DOCUMENTS 1452061  8/1966  France ................................. 350/319
498585  4/1976  U.S.S.R. .............................. 350/319

OTHER PUBLICATIONS

Letter to Gerald M. Smith from Ethan Wilson Cliffton, Apr. 9, 1986.
Letter to Robert P. Kraft, Ph.D. from Ethan Wilson Cliffton, Apr. 10, 1986.
Letter to Peter Lissamen, Ph.D. from Ethan Wilson Cliffton, Jul. 17, 1986.
Letter to David Halliday from Ethan Wilson Clifton, Aug. 7, 1986.
Handwritten memorandum summarizes a conversation between applicant and Dr. Lissamen, Sep. 11, 1986.
Letter to Peter Lissamen, Ph.D. from Ethan Wilson Cliffton Jan. 6, 1987.
Letter to Ethan Wilson Cliffton from P.B.S. Lissamen, Jan. 29, 1987.
Ethan Wilson Cliffton, "A Vestibulo-Ocular Dome", Feb. 5, 1987.

Primary Examiner—Rodney B. Bovernick
Assistant Examiner—Loha Ben
Attorney, Agent, or Firm—Kenyon & Kenyon

[57] ABSTRACT

A split-sphere observatory enclosure wherein the antrum segment is capped with a shutter lid. The rotor which is the active shutter segment sweeps through an elongate curved aperture in the shutter lid to reveal the oculus. The oculus may be completely covered by the shutter lid or completely exposed at any elevation between the horizontal and vertical or zenith positions. The weather resistance of the enclosure is enhanced through the provision of continuous seals between the segments.

7 Claims, 5 Drawing Sheets

FIXED SHUTTER CONSTRUCTION FOR A SPLIT-SPHERE OBSERVATORY DOME

BACKGROUND OF THE INVENTION

The present invention relates to observatory domes for astronomical observatories, space satellite tracking stations, and other similar astronomical purposes. More particularly, the invention relates to a split-sphere observatory dome having a fixed shutter.

Observatory domes which are adapted to be utilized for astronomical purposes are generally of a hemispherical configuration provided with an aperture of generally rectangular configuration running longitudinally from the area of the apex of the dome (zenith or vertical axis) downwardly to the vicinity of the equatorial region of the dome (horizontal axis) so as to facilitate the aiming or sighting of a telescope or the like therethrough.

A dome of the nature described is generally provided with a weather-tight shutter assembly adapted to permit selective opening or closing of the sighting aperture. The shutters utilized are normally fabricated from sheet metal and are characterized by generally elongated rectangular longitudinally curved, or convex configuration and are mounted exteriorly of the dome so as to be adapted to uncover the sighting aperture by upward movement of the shutters on a plane tangentially disposed with respect to the curvature of the dome.

It is important that the telescope and other costly equipment usually housed within such domes be properly protected from the entrance of moisture into the dome. One problem with conventional domes results from the fact that under present practice the shutters do not provide a completely water-tight closure in the normal closed position. Thus, water enters the interior of the dome and thereby causes considerable damage to the instruments within the dome.

Conventional observatory domes of the type described above suffer from a number of other problems which are primarily attributable to the use of shutters as described above. In particular, in conventional observatory domes large openings are not possible without limiting horizon viewing with conventional shutters and wind screens. Moreover, the concentric protrusions common to conventional shutter design increase wind load and cavitational icing. Further, conventional domes require massive arch girders and eccentric ring girders to resist bending and spreading of the slot. Finally, the provision of moveable shutters hinders the weather resistance of the dome as discussed above.

A different form of dome design is employed in the French Observatory Pic-du-Midi. The French design involves a split-sphere observatory dome comprising a spherical rotor provided with a circular aperture or oculus and rotatably mounted in a semi-spherical antrum that has a tilted axis. In the French observatory, the oculus is closed by a double hatched door. This structure is adapted to accommodate only small telescope apertures because of the limited size of the doors. Further, the provision of moveable doors results in some of the same problems experienced in conventional observatory domes.

It is therefore an object of the present invention to obviate the disadvantages experienced in conventional observatory domes. More specifically, it is the object of the present invention to provide a fixed shutter construction for use in a split-sphere observatory dome. It is a further object of the present invention to provide a fixed-shutter construction which improves the weather resistance of the dome. Finally, it is an object of the present invention to provide a means for supporting the rotor shell of a split-sphere observatory dome.

SUMMARY OF THE INVENTION

The aforementioned objects as well as other objects are achieved by the present invention. More specifically, these objects are achieved by capping the antrum segment with a fixed shutter lid having an elongate aperture behind which the active shutter segment, i.e., the rotor, sweeps through the aperture to reveal the oculus. By this means, larger openings are possible in the rotor without limiting horizon viewing with conventional shutters and wind screens. Further, limiting the diameter of the oculus to the exact viewing cone of the instrument affords the greatest protection from wind perturbations.

The weather resistance of the dome is enhanced by a continuous seal between the various segments including the rotor and the antrum segments. Wind load and cavitational icing are reduced because the sphere is unencumbered by concentric protrusions common to other shutter designs.

Further, by capping the rotor pivot it is possible to provide an uplift bearing for supporting the rotor. Thus, the massive arch girders and eccentric ring girders of conventional dome structures are not required.

Preferably, the shutter lid comprises a partially-spherical member mounted on the antrum and having a scalloped edge that provides a curved aperture for the oculus as it tracks a celestial object.

DETAILED DESCRIPTION OF THE PREFERRED EMBODIMENT

Figure 1:
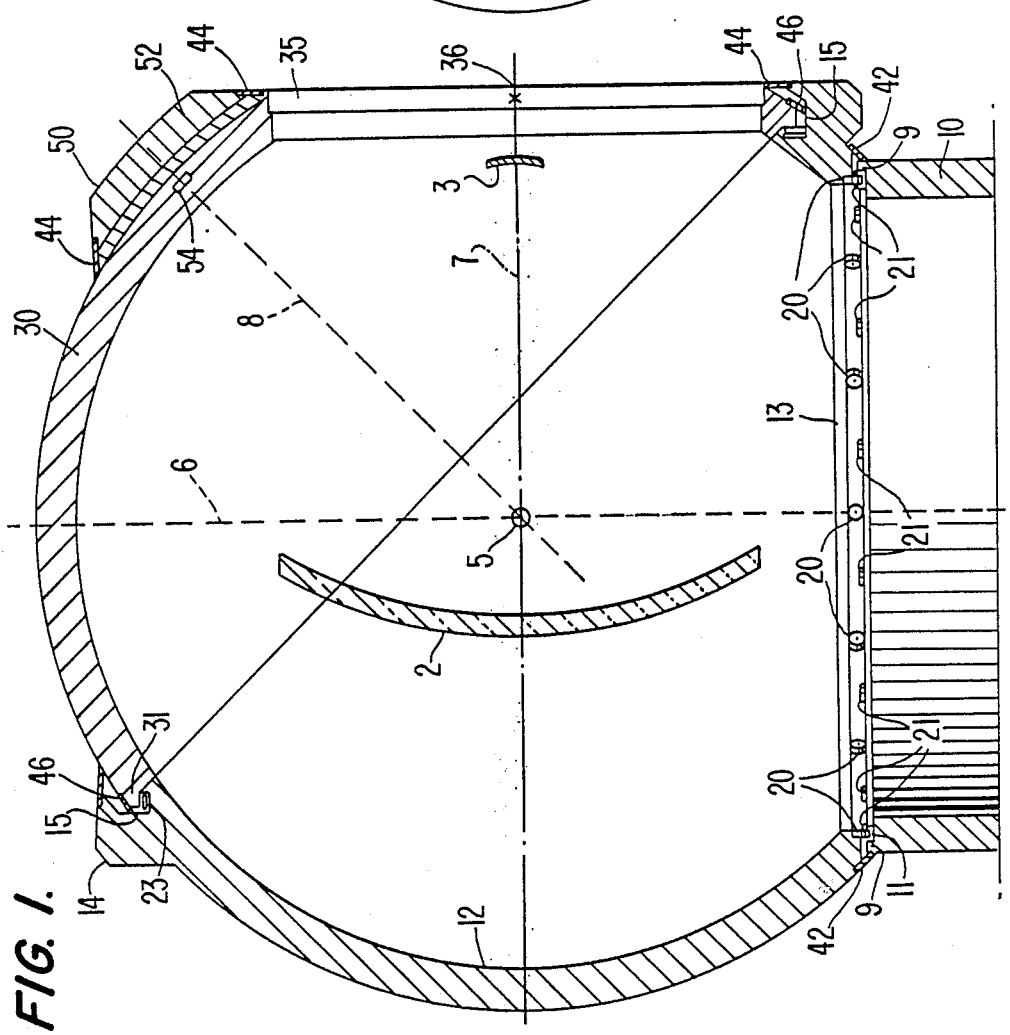
FIG. 1 is a cross-sectional view of the split-sphere observatory dome of the present invention.

As shown in FIG. 1 the present invention comprises a cylindrical base 10 and having an axis 6 which is also the zenith or vertical axis of the observatory dome. An antrum shell 12 is supported on the cylindrical base 10 for a rotation about the zenith axis 6.

Any suitable and well known means may be provided for facilitating the rotation of the antrum shell 12 on the cylindrical base 10. For the purposes of illustration, this may be accomplished by the means shown in the drawings. To this end, dome trucks comprising weight-bearing rollers 20 journaled in bearing brackets (not shown) are shown mounted at spaced intervals upon the cap ring 11 at the top of the cylindrical base 10, and the antrum shell 12 is rotatably supported upon these rollers by means of the base ring 13 of the antrum shell.

In order to hold the antrum shell 12 in alignment with the cylindrical base 10 (which corresponds to the observatory), as the antrum revolves thereon, horizontal guide rollers 21 are journaled upon bearing brackets (not shown) mounted at spaced intervals upon the cap ring 11 of the cylindrical base 10 and have rolling contact with a flange 9 extending from the cap ring 11. This support arrangement is conventional and is shown for example in U.S. Pat. No. 2,996,844 to Paulson.

As shown in FIG. i, the antrum shell 12 is split at an acute angle to the zenith axis 6 and the horizontal axis 7. Preferably, the split angle is 45° from both the zenith axis 6 and the horizontal axis 7.

The periphery of the open portion of the antrum shell 12 comprises a lid arm 14 and a rotor receiving channel 15. A rotor shell 30 is supported on the antrum shell 12 for revolution about periphery of the antrum shell. More specifically, the periphery of the rotor shell 30 is formed with a peripheral extension 31 which is received in the rotor receiving channel 15 and is mounted for rotation therein on a series of bearings 23 of a convention structure similar to the bearing members 20 and 21 described above. The rotor shell revolves about a pivot axis 8 which is perpendicular to the plane of the periphery of the antrum shell 12.

A circular oculus 35 is provided in the rotor shell 30. In the drawings, the oculus is shown as having an oculus diameter which is approximately equal to the radius (i.e. ½ the diameter) of the sphere formed by the antrum shell 12 and the rotor shell 30. This dimensioning enables horizon to zenith viewing through the oculus. The 1 to 2 ratio of the diameter of the oculus to the diameter of the dome is well within the maximum theoretical limit of these ratios which is determined by the following formula:

$$D_o = D_d(2)^{-\frac{1}{2}} = 0.707 D_d$$

In practicing the present invention it is desirable that the diameter of the oculus be limited to the exact viewing cone of the instrument insofar as this affords the greatest protection from wind perturbations.

It should be evident that through the coordinated rotation of the antrum shell 12 about the zenith axis 6 and the rotor shell 30 about the pivot axis 8, the center 36 of the oculus 35 can be brought into any position in the hemisphere located above the horizon axis 7. More specifically, rotation of the rotor shell 30 about the periphery of antrum shell 12 adjusts the elevation of the center 36 of the oculus 35 between a minimum level shown in FIG. 1 and a maximum at which the center 36 of the oculus 35 lies on the zenith axis 6. As the rotor shell 30 revolves around the pivot axis 8 its azimuth angle also varies. However, since the antrum shell 12 rotates about the zenith axis 6, the center 36 of the oculus 35 can be adjusted so as to point in any direction with respect to the zenith axis 6 or to be on the zenith axis 6.

In accordance with an important aspect of the present invention, a partially spherical shutter lid 50 is fixedly mounted on the lid arm 14 of the antrum shell 12. The shutter which is essentially an extension of the antrum shell 12 covers a substantial portion of the rotor shell 30 but includes a scalloped edge 52 forming a curved elongated aperture between the edge of the antrum and the end of the lid such that a curved portion of the rotor shell remains uncovered. The curved portion of the rotor shell 30 which remains uncovered preferably corresponds to the path of the oculus as the center 36 of the oculus 35 moves from the horizontal axis 7 to the zenith axis 6. The specific configuration of the lid is more clearly evident from FIGS. 2-6 which will be discussed below.

As shown in FIG. 1, the shutter lid 50 includes a lid cap portion through which the pivot axis 8 passes. The rotor shell 30 is pivotably supported by an uplift bearing 54 fixed to the lid 50. Through the provision of the uplift bearing 54, a portion of the weight of the rotor shell 30 is supported by the shutter lid 50, which is itself supported via lid arms 14 on the antrum shell 12, which in turn rests on the cylindrical base 10. Accordingly, the weight of the rotor shell 30 is supported without need for a massive arch girder of the type employed in conventional dome constructions. Moreover, since the uplift bearing is located at the pivot axis 8, which corresponds to the geometric center of the rotor shell 30, the weight of the rotor shell 30 is evenly distributed along the periphery of the antrum shell 12.

In accordance with another important aspect of the present invention, three continuous seals are provided in the observatory. A first continuous seal 42 is provided between the antrum shell 12 and the cylindrical base 10. A second continuous seal 44 is provided between the shutter lid 50 and the rotor shell 30. A third continuous seal 46 is provided between the rotor shell 30 and the antrum shell 12. The provision of the three continuous seals 42, 44 and 46 enhances the weather resistance of the observatory dome.

As shown in FIG. 1, the observatory includes a conventional primary mirror 2 and a conventional secondary mirror 3 which are illustrated to demonstrate proportion.

As additionally shown in FIG. 1, the zenith axis 6, the pivot axis 8 and the horizontal axis 7 are coincident about the dome center 5 which is also the instrument axis/centroid.

Figure 2:
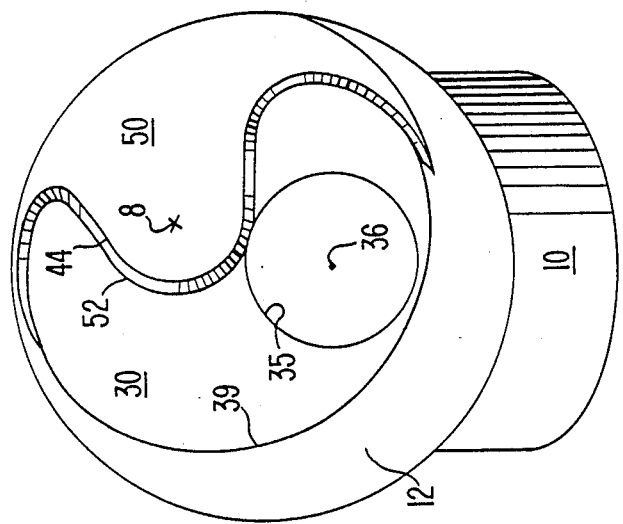
FIG. 2 is a perspective view of the split-sphere observatory dome of the present invention.

FIG. 2 is a perspective view of a somewhat schematic representation of the present invention. This perspective view makes it possible to see that the shape of the exposed portion of the rotor shell 30 corresponds to the path of the oculus 35 as it moves from the position where its center 36 is aligned with the horizontal axis 7 to the position where its center 36 is aligned with the zenith axis 6. It should also be apparent from FIG. 2 that, although a curved shaped portion of the rotor shell 30 is always uncovered, the portion which is uncovered varies as the rotor shell 30 revolves about the pivot axis 8. Thus, through proper rotation of the rotor shell 30, any portion of the rotor shell may be covered by the lid 50. Thus, it is possible to rotate the rotor shell 30 such that the oculus 35 is completely covered by the lid 50 as shown for example in FIG. 6. In this position the seals 42, 44 and 46 cooperate to completely seal the interior of the observatory from the prevailing weather conditions outside of the observatory. Thus, in essence, the lid 50 functions as a shutter lid which is fixed to the antrum shell 12. As previously discussed, such a fixed shutter arrangement is preferably in many ways to conventional shutters.

FIGS. 3-6 illustrate the observatory when the oculus is positioned at various positions with respect to the shutter lid 50.

Figure 3:
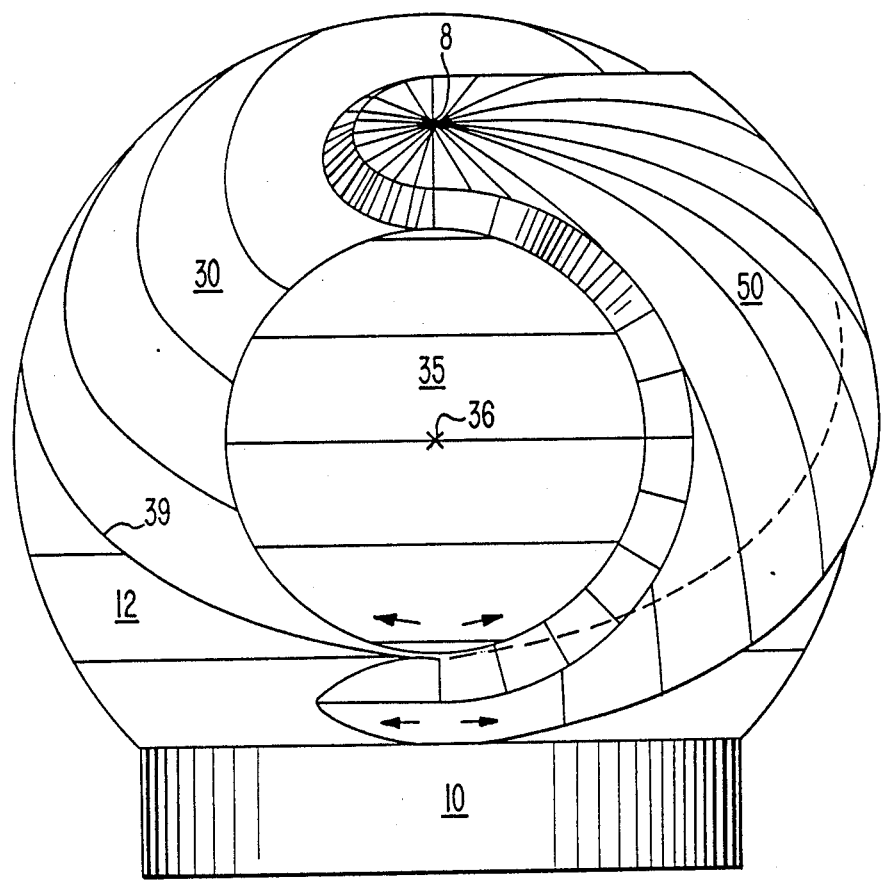
FIG. 3 is a front elevation of the present invention with the oculus at the horizon.

In FIG. 3, the center 36 of the oculus 35 is coincident with the horizontal axis 7. Thus, the observatory is in the same position as is shown in FIG. 1. In FIG. 3, the right side of the periphery of the oculus 35 substantially corresponds to the side edge of the shutter lid 50. Furthermore, the inside surface of the antrum shell 12 is visible through the oculus 35.

Figure 4:
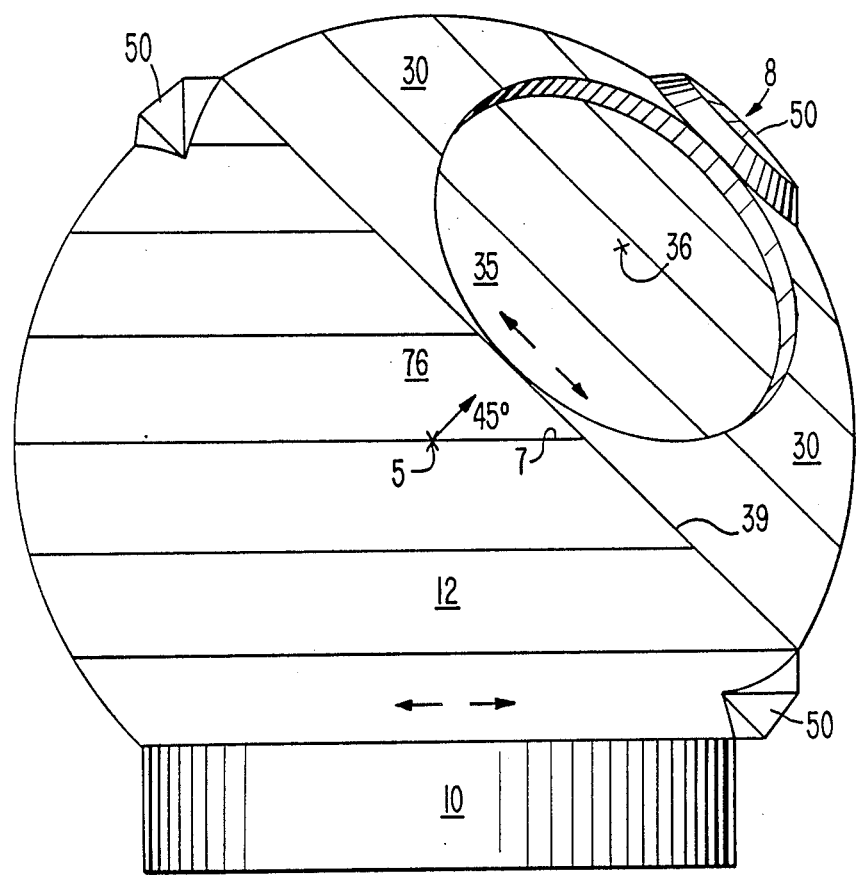
FIG. 4 is an aperture side elevation with the oculus at 45°.

FIG. 4 illustrates the observatory after the rotor shell 30 has been rotated 90 in a clockwise direction from the position shown in FIG. 3. As shown in FIG. 4, a 90° rotation of the rotor shell 30 brings the center 36 of the oculus, 35 to a 45° angle with respect to the horizon axis 7. The entire oculus 35 is still uncovered, and portions of the rotor shell 30 on either side of the oculus 35 are also uncovered. The interior of the rotor shell 30 is visible through the oculus 35.

Figure 5:
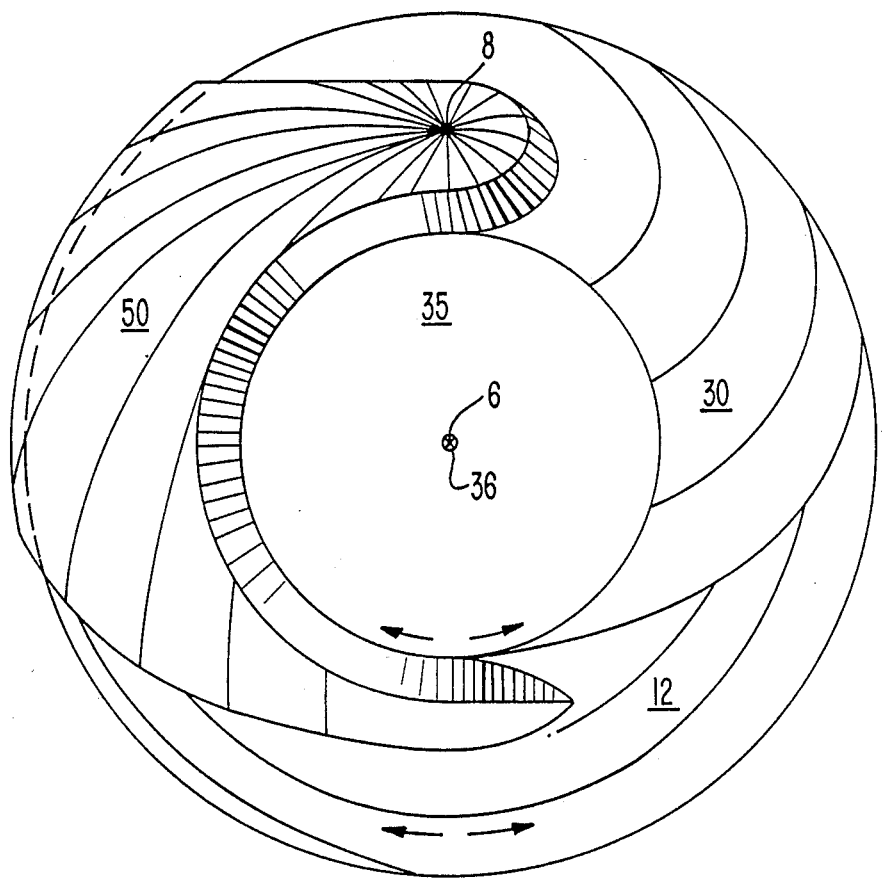
FIG. 5 is a zenith plan view of the present invention.

FIG. 5 illustrates the observatory after the rotor shell 30 has been rotated an additional 90°. As shown in FIG. 5, the additional 90 rotation (a total of 180° from the position shown in FIG. 3) brings the center 36 of the oculus 35 into alignment with the zenith axis 6. The entire oculus is still uncovered and the left hand periphery of the oculus 35 substantially conforms to the shape of the lid 50. Thus, continued rotation of the rotor shell 30 will result in the oculus 35 beginning to become covered by the lid 50. In this position, the bottom of the base 10, i.e., the observatory floor, is visible through the oculus 35.

Figure 6:
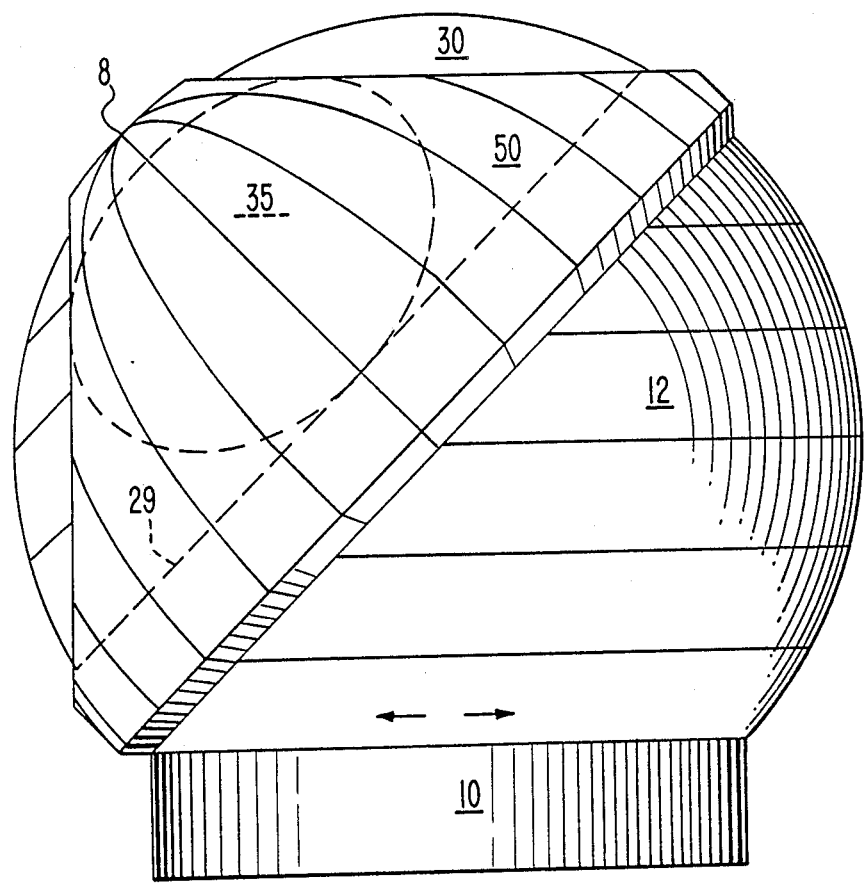
FIG. 6 is a lid side elevation with the oculus covered.

FIG. 6 illustrates the observatory after the rotor shell 30 has been rotated an additional 90° in a clockwise direction (a total of 270° degrees in clockwise direction from the position shown in FIG. 3). As shown in FIG. 6, the additional 90° rotation brings the oculus 35 completely under the lid 50. In this position, the lid 50 functions as a shutter lid and in conjunction with the seals 42, 44 and 46 seals the interior of the observatory.

From all the foregoing it should be evident that the present invention provides a shutter lid which is fixed to the observatory but yet enables a complete covering of the oculus while at the same time permitting selective viewing of any point in the hemisphere above the horizontal, including the zenith point.

It is believed that the foregoing is a full and adequate disclosure of the invention to which this application is directed. Although no specific disclosure has been made as to either the means of driving the various components of the observatory or the specific optical instruments within the observatory, those skilled in the art will recognize that conventional means are adequate for both of these purposes and can be employed as desired.

What is claimed is:

1. In a split-sphere observatory dome of the type comprising:
   a cylindrical base having a circular peripheral edge.
   an antrum shell having a first circular peripheral edge rotatably supported on the circular peripheral edge of the cylindrical base and a second circular peripheral edge disposed at an acute angle with respect to said first circular peripheral edge,
   a rotor shell having a first circular peripheral edge rotatably supported on the second circular peripheral edge of the antrum shell and a second circular peripheral edge disposed at an angle with respect to said first circular peripheral edge of said rotor shell and tangential thereto at a point, said second circular peripheral edge of said rotor shell defining the periphery of a planar oculus;
   wherein upon rotation of the rotor shell said oculus revolves about an axis of rotation along a path wherein the orientation of the plane of the oculus varies between a vertical orientation and a horizontal orientation;
   the improvement comprising:
   a shutter lid fixed to said antrum shell proximate said second circular peripheral edge of said antrum shell, said shutter lid covering a portion of said rotor shell and exposing a portion of said rotor shell, said oculus being revolvable between a position wherein said lid completely covers said oculus and a position wherein said oculus is completely exposed.

2. The split-sphere observatory dome of claim 1 wherein said shutter lid comprises a partially spherical member having an elongate scallop formed in a peripheral edge thereof, said elongate scallop defining the exposed portion of the rotor shell and corresponding to the path of the oculus as the oculus moves between the vertical orientation and the horizontal orientation such that said oculus can be completely exposed while oriented in any position between the vertical orientation and the horizontal orientation.

3. The observatory dome of claim 1 wherein said shutter lid extends over the axis of rotation of said rotor shell.

4. The observatory dome of claim 3 wherein an uplift bearing mounted on said shutter lid supports said rotor shell for rotation at the rotor shell axis of rotation.

5. The observatory dome of claim 1 wherein a continuous seal is provided between said shutter lid and said rotor shell.

6. The observatory dome of claim 5 wherein a continuous seal is provided between said rotor shell and said antrum shell.

7. The observatory dome of claim 6 wherein a continuous seal is provided between said antrum shell and said cylindrical base.

* * * * *